United States Patent [19]

Fillion

[11] Patent Number: 4,510,809

[45] Date of Patent: Apr. 16, 1985

[54] DEVICE FOR MEASUREMENT OF AMPLITUDE AND ANGULAR POSITION OF AN UNTRUE RUNNING IN A REVOLVING SYSTEM

[75] Inventor: Jean-Claude Fillion, Paris, France

[73] Assignee: S.N.E.C.M.A., Paris, France

[21] Appl. No.: 564,178

[22] Filed: Dec. 22, 1983

[30] Foreign Application Priority Data

Apr. 3, 1983 [FR] France .................................. 83 00004

[51] Int. Cl.³ ............................................. G01M 1/16
[52] U.S. Cl. ........................................ 73/457; 73/462
[58] Field of Search .................. 73/66, 455, 457, 462, 73/464, 465; 364/508

[56] References Cited

U.S. PATENT DOCUMENTS

| 3,102,429 | 9/1963 | Hardy et al. | 73/462 |
| 4,162,634 | 7/1979 | Hofmann | 73/462 |
| 4,238,960 | 12/1980 | Curtis et al. | 73/462 |

FOREIGN PATENT DOCUMENTS

| 729901 | 5/1955 | United Kingdom | 73/462 |

Primary Examiner—James J. Gill
Attorney, Agent, or Firm—Oblon, Fisher, Spivak, McClelland & Maier

[57] ABSTRACT

A first processing circuit receives signals from a vibratory acceleration and a speed of rotation and position sensor and comprises integration and filter means for providing a signal (sb) representative of the amplitude of any untrue running. A second processing circuit receives the output signal (sw) from the speed of rotation and position sensor and the signal (sb) and includes means for determining the phase difference between the signals (sw) and (sb). A memory (33) stores information representative, for different revolving systems and/or test conditions, of the difference between the measured phase difference and the angular position of an imbalance causing untrue running with reference to an origin on the revolving system. Appropriate information is read from the memory and combined with the measured phase difference in response to the actuation of selection means to provide an accurate output of the angular position of any imbalance causing untrue running.

7 Claims, 3 Drawing Figures

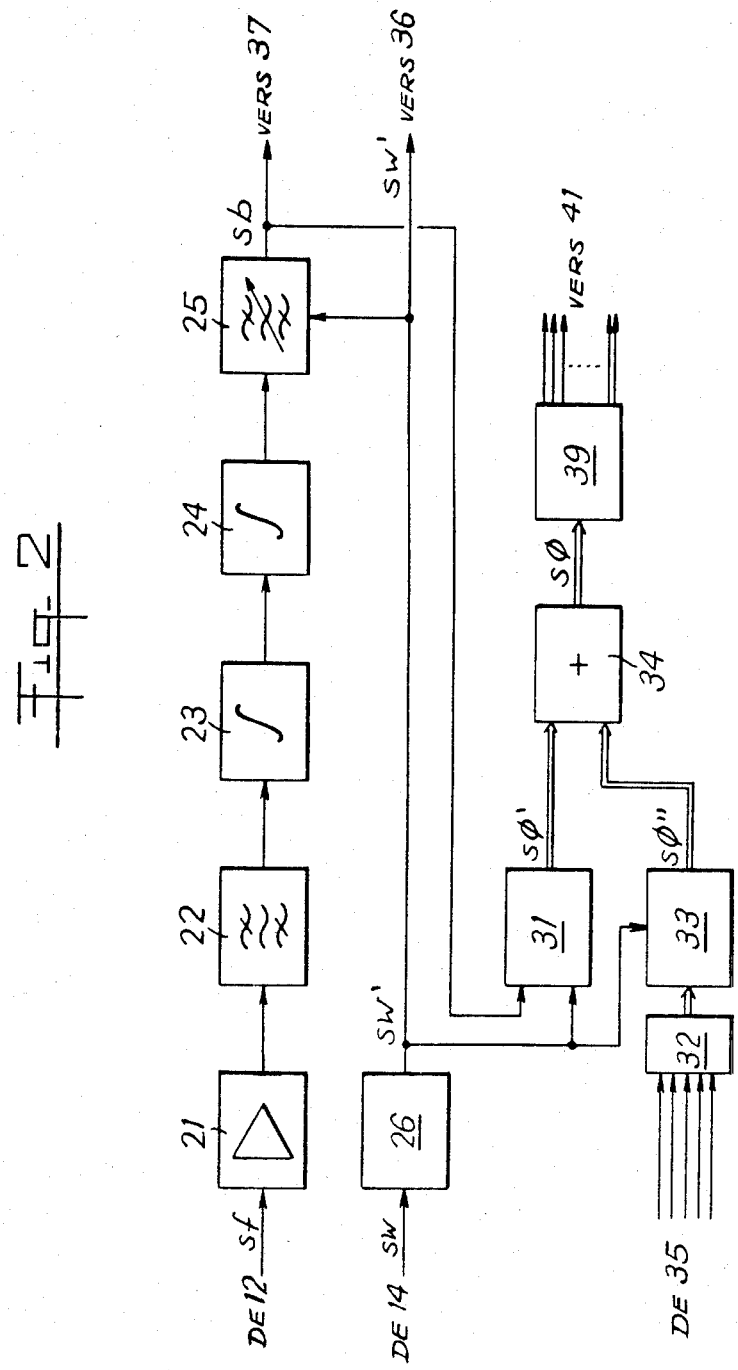

DEVICE FOR MEASUREMENT OF AMPLITUDE AND ANGULAR POSITION OF AN UNTRUE RUNNING IN A REVOLVING SYSTEM

BACKGROUND OF THE INVENTION

1. Technical Field

The present invention relates to the measurement of the amplitude and angular position of an untrue running in a revolving system.

The invention may be particularly, but not exclusively applied to measuring apparatus for providing the necessary indications for balancing an aircraft jet engine.

2. Prior Art

The verification of the balance of the jet engines of an aircraft is a control operation generally effected on a track. For this purpose, the jet engines of the aircraft are each provided with a vibratory acceleration sensor on a bearing and a speed of rotation and position sensor. These sensors are permanently mounted and the detection and measurement of a possible untrue running is realised by connecting a suitable apparatus to the output signals of the sensors. It is known to use an apparatus which directly provides an indication of the amplitude of an untrue running and an indication of the angular position of the imbalance causing the untrue running. In such an apparatus, the signal from the vibratory acceleration sensor, before amplification and a first filtering, undergoes two successive integrations and is applied to a tracking narrow bandpass filter centred permanently on a frequency corresponding to the rate of rotation measured by the other sensor. The output signal of the tracking filter is representative of the amplitude of any untrue running. The phase difference between this output signal and that provided by the position and speed of rotation sensor is determined in order to provide information representative of the angular position of the imbalance causing the untrue running.

In practice, the use of the information provided by this known measuring apparatus appears to pose several problems.

First of all, in certain cases, it is necessary for the operator to correct the phase difference measured by the apparatus by an angle representing any angular displacement between the positions of the vibratory force sensor and the speed of rotation and position sensor. This displacement is not necessarily the same on all types of engine. Further, balance controls are not generally carried out by highly qualified personnel and are accomplished in difficult conditions (outside and in noise). Errors in the sign of the correction of the measured phase difference and in the conversion of the measured phase difference to a particular blade to which a mass must be added for example are frequently made.

Moreover, it is established that the measured phase difference between the signal representing the amplitude of the untrue running and the signal from the speed of rotation and position sensor, after correction for the possible angular shift between the positions of the sensors, does not always correspond to the real value of the angular position of the imbalance causing the untrue running.

In effect, another error is introduced by the natural phase difference of the electronic circuits of the measuring apparatus. It can be shown that a supplementary error is introduced by a phase difference which is a "mechanical" function of the test conditions. It is actually established that different phase differences are measured on engines according to whether they are mounted on the bench or on an aircraft, even though the engines may be identical in all other respects. It has equally been demonstrated that the speed of rotation in the course of a test has a far from negligible influence.

These difficulties explain why in practice the balancing of an engine is frequently done by trial and error and without necessarily arriving at a perfect result.

SUMMARY OF THE INVENTION

The present invention provides apparatus for measuring the amplitude of an untrue running of a revolving system and the angular position of the imbalance causing said untrue running, from output signals provided by a vibratory acceleration sensor and a speed of rotation and position sensor associated with the revolving system, the apparatus including a first processing circuit having an input which is adapted to receive the output signals from the vibratory acceleration and the speed of rotation and position sensors, said circuit including integration and filter means for providing a first output signal representative of the amplitude of any untrue running of the revolving system, a second processing circuit having two inputs which are respectively adapted to receive the output signal from the speed of rotation and position sensor and said first output signal and which circuit includes means for determining the phase difference between said input signals; a memory in which is stored information at different locations for different revolving systems and/or different test conditions, representative of the difference between said determined phase difference and a true angular position of an imbalance causing untrue running with reference to a predetermined origin on the revolving system, means adapted to combine said determined phase difference with information read from the memory in order to provide a second output signal representative of the angular position of the imbalance causing the untrue running; and selection means selectively actuable to control which stored information is read from said memory for use by said combining means.

With the above apparatus it is enough for the user to operate the selection means, for example by touching appropriate controls on the apparatus, in dependence on the revolving system being tested and/or the test conditions, for the signal representative of exact angular position of the imbalance causing the untrue running to be directly displayed.

In the case of application to the balancing of aircraft engines, the selection is effected by the operator in dependence on the type of engine and, possibly on the type of aircraft to which the engine is mounted. The stored information for one engine may be different in dependence on whether that engine is mounted on one aircraft or another. Other selections can be envisaged, for example bench test or normal running of the engine in the course of the test.

The information stored in the memory is determined experimentally. To achieve this, for a perfectly balanced engine and given test conditions, an untrue running is caused by introducing an imbalance at a known angular position with reference to a given origin and the difference between this angular position and the calculated phase difference between the signal representing the amplitude of the untrue running and the signal from the speed of rotation and position sensor is measured. Several measurements can be carried out while changing the angular position of the imbalance in order to verify the constancy of the measured difference. If necessary, the average value of the different measurements is used. The differences that have been measured experimentally contain the different components of error: phase difference between the positions of the sensors, electrical phase differences of the electronic circuits and mechanical phase differences.

In a variant of the apparatus, instead of determining the difference between the known angular position of the imbalance causing the untrue running and the calculated phase difference, the difference between the angular position of the added mass needed to produce balance (that is 180° relative to the angular position of the imbalance) and the calculated phase difference is determined. In that case during subsequent use of the measuring apparatus, the second output signal representative of the angular position of the imbalance causing the untrue running directly provides the exact angular position, by reference to a given origin, of the position where a compensating mass must be placed.

A series of measurements are carried out to cover the different situations where use of the measuring apparatus is envisaged, and the measured differences are stored in the memory at different addresses.

In a preferred embodiment, the measuring apparatus includes display means in the form of a graduated circle permitting a direct read out of the angular position of the imbalance causing the untrue running and/or angular position at which a compensation mass is to be added.

BRIEF DESCRIPTION OF THE DRAWINGS

FIG. 2 is a diagram of an electronic circuit of an embodiment of the measuring apparatus in accordance with the invention.

The description which follows relates to apparatus for measuring untrue running in an aircraft engine. This is not intended to exclude the application of this type of apparatus to other revolving systems.

Figure 1:
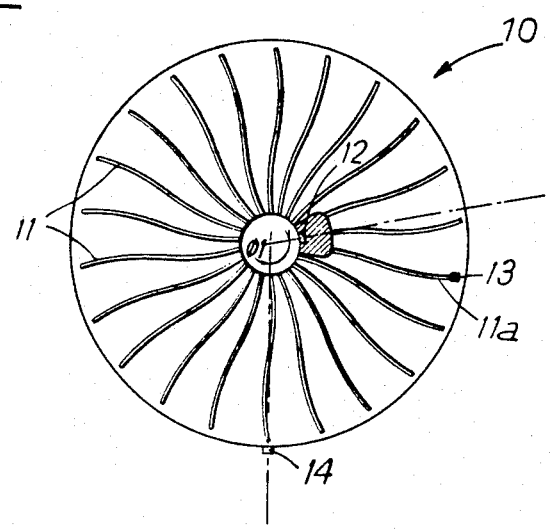
FIG. 1 is a schematic view of a revolving system equipped with vibratory acceleration and speed of rotation and position sensors.

In FIG. 1 the blades 11 of an engine 10 are schematically represented. A vibratory acceleration sensor indicated at 12 is mounted on one of the support bearings of the engine shaft for providing a signal, the amplitude of which is representative of the stresses which are being applied to it. The sensor 12 is for example of the piezoelectric type. A speed of rotation sensor comprises a magnetic marker 13 mounted on a blade 11a and a magnetic type detector 14 (for example a Hall effect probe), which provides, at the output of the detector, a signal representative of the speed of rotation and of the position of the revolving part of the engine (one pulse per revolution). The sensors 12 and 13–14 are permanently fixed, during construction of the engine. The positioning of the magnetic marker 13 provides an origin for angular reference of the revolving system. Each blade 11 has at least one threaded hole on an exterior edge for allowing the possible screwing in of compensation masses in case an imbalance is detected.

The signals sf and sw provided by the acceleration and speed of rotation and position sensors are received by the processing circuits illustrated in FIG. 2 in order to detect and measure any untrue running.

A first processing circuit receives the signal sf and sw in order to provide a signal sb representative of the amplitude of any untrue running. For this purpose, the processing circuit comprises, in series between the input receiving the signal sf and the output delivering the signal sb, an amplifier 21, a bandpass filter 22, a first integrator 23, a second integrator 24 and a tracking narrow band filter 25. The bandpass filter 22 is intended to eliminate the components of signal sf which are located outside the frequency range corresponding to the rotation speed limits of the engine. The integrators 23 and 24 transform a signal representative of an acceleration into a signal representative of a displacement. The filter 25 is a bandpass filter having a narrow band centred permanently on a frequency corresponding to the speed of rotation of the engine. For this purpose, the filter 25 receives a signal sw' representative of the rotation frequency of the engine, in order to control the central frequency of its pass band. The signal sw' is provided by a circuit indicated at 26 which receives the signal sw and delivers a rectangular or square pulse train of frequency equal to the speed of rotation of the engine expressed in revolutions/s. The variable cut-off frequency filter 25 may conform to that described in French patent application No. 79.145159 of June 2nd, 1979. At the output of filter 25, the signal sb has an amplitude representative of the radial displacement of the axis of the engine as measured by the sensor 12, which occurs with a frequency corresponding to the speed of rotation. The signal sb is therefore representative of the amplitude of the untrue running.

A second processing circuit receives the signal sb and sw' in order to provide a signal $s\phi$ representative of the real angular position $\phi$ of the imbalance causing the untrue running with reference to magnetic marker 13. A phase difference calculating circuit 31 receives the signals sb and sw' and delivers a digital signal $s\phi'$ representative of the phase differences $\phi$ between the signals. The signal $s\phi'$ is applied to an input of an adder 34 which receives, at its other input, a signal $s\phi''$ read from a memory 33 and representing the difference $\phi''$ between the angle $\phi$ and the phase difference $\phi'$. The adder 34 provides in digital form the signal $s\phi$ sought. The information $\phi''$ is read from the memory 33 at an address indicated by an address circuit 32 controlled by selection keys 35 (FIG. 3).

The information $\phi''$ has for components: any angle $\phi'$ between the positions of the sensor 12 and of the detector 14 fixed on the casing of the engine, the electrical phase difference $\phi 2$ introduced by the electronic circuits of the first processing circuit, and the mechanical phase differences $\phi 3$ depending on the engine, the aeroplane to which the engine is mounted and the speed of rotation. The information $\phi''$ has been pre-stored in the memory 33 for various different engines and, possibly engine aircraft combinations for which the measuring apparatus is intended to be used. For each of the engines or engine aircraft combination there is provided a particular key 35 (FIG. 3) which, when it is depressed by the operator, causes the corresponding information to be read out from memory 33. The memory is for example a re-programmable read only memory (REPROM). The determination of information $\phi''$ is effected as indicated above from measurements carried out on balanced engines to which a known imbalance has been added to cause untrue running. It can be seen that one of the components of φ" depends on the speed of rotation. It is therefore necessary that the measurement of untrue running be carried out at a speed of rotation N (in revs/s) equal or close to that at which the determination of φ" took place. To achieve this, the signal sw' is applied to a display circuit 36 to provide for example in digital form an indication representing the speed of the engine under test (or the percentage of its speed with reference to a maximum speed). It is therefore necessary, while using the measuring apparatus, to verify that the displayed speed N is within predetermined limits.

It has been envisaged above that each key 35 is to be associated with a particular type of engine or a particular engine aircraft combination.

Figure 3:
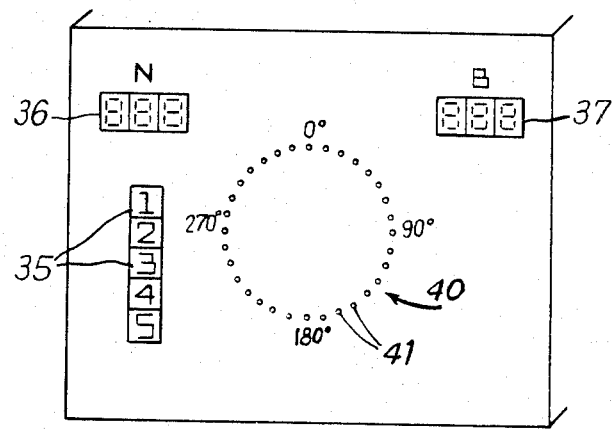
FIG. 3 is a schematic view of the front face of this apparatus.

FIG. 3 shows schematically the front face of the measuring apparatus. The speed of rotation N is registered digitally on a display circuit 36. A second digital display circuit 37 is intended to display, in a manner known per se, information B representing the amplitude of the measured untrue running or the magnitude of a compensation mass to be added. This information is obtained by converting into digital form the peak amplitude or mean of the signal sb and application of a suitable multiplier. The angular position of the imbalance causing the untrue running can be displayed in degrees in digital or analog (Galvanometric) form from the signal sφ. Direct readout of the angular position of the imbalance causing the untrue running may be provided by the use of a graduated circle 40 made up of elements such as electroluminescent diodes 41. The digital signal sφ is decoded by a circuit 39 (FIG. 2) which controls the illumination of a corresponding diode. The graduation can be in degrees from an origin defined by the position of the magnetic marker 13 or in numbers of blades counting from the blade 11a.

In a variant, the angular position indicated by the illumination of a particular diode 41 can be that of the place where a compensation mass must be placed, instead of the position of the imbalance itself. The user can then know directly the value and exact position of the compensation mass, which will practically eliminate all possibility of errors or trial and error.

I claim:

1. Apparatus for measuring the amplitude of an untrue running of a revolving system and the angular position of the imbalance causing said untrue running, from output signals provided by a vibratory acceleration sensor and a speed of rotation and position sensor associated with the revolving system, the apparatus including
   a first processing circuit having an input which is adapted to receive the output signals from the vibratory acceleration and the speed of rotation and position sensors, said circuit including integration and filter means for providing a first output signal representative of the amplitude of any untrue running of the revolving system,
   a second processing circuit having two inputs which are respectively adapted to receive the output signal from the speed of rotation and position sensor and said first output signal, and which circuit includes means for determining the phase difference between said input signals,
   a memory in which is stored information at different locations for different revolving systems and/or different test conditions, representative of the difference between said determined phase difference and a true angular position of an imbalance causing untrue running with reference to a predetermined origin on the revolving system,
   means adapted to combine said determined phase difference with information read from the memory in order to provide a second output signal representative of the angular position of the imbalance causing the untrue running; and
   selection means selectively actuable to control which stored information is read from said memory for use by said combining means.

2. Measuring apparatus according to claim 1, in which said selection means includes keys each associated with a particular revolving system and/or a particular test condition, the apparatus further including an address circuit associated with the memory which outputs to the memory an approximate address of the required information selected by actuation of the appropriate key.

3. Measuring apparatus according to claim 1, in which said second output signal corresponds to the angle of the imbalance causing the untrue running with reference to said predetermined origin.

4. Measuring apparatus according to claim 1, in which said second output signal corresponds to the angle with reference to said predetermined origin of the position where an untrue running compensation mass must be placed.

5. Measuring apparatus according to claim 1, further including display means in the form of a graduated circle permitting a direct read out of the angular position of the imbalance causing the untrue running and/or the angular position at which a compensation mass is to be added.

6. Measuring apparatus according to claim 5, in which the graduated circle is formed by a plurality of electroluminescent elements.

7. Measuring apparatus intended to be used for balancing a rotor of a jet engine having a first vibratory acceleration sensor and a second sensor for providing an indication of the rate of rotation of the rotor and its angular position, each sensor having an output, said apparatus including
   a first processing circuit having an output and two inputs each connectable to a respective said sensor output, said circuit including integration and filter means arranged in a manner known per se to produce at said output a signal representative of the amplitude of any untrue running of said rotor,
   a second processing circuit having an output, a first input connectable to the output of the second sensor, and a second input connected to said output of said first processing circuit and including means for producing at said output a signal representative of the phase difference between said input signals, and
   a memory in which various phase correction factors are stored at different addresses,
   selection means adapted to be operated by a user of the apparatus and connected to said memory to control the reading out of a selected one of said phase correction factors, and
   adding means having an input connected to the output of said second processing circuit, an input connected to said memory to receive said selected correction factor, and an output for providing a signal representative of the true position of the imbalance causing said untrue running.

* * * * *